United States Patent
von Flotow et al.

(10) Patent No.: US 6,409,465 B1
(45) Date of Patent: Jun. 25, 2002

(54) BLADE VIBRATION CONTROL IN TURBO-MACHINERY

(75) Inventors: Andreas von Flotow, Hood River, OR (US); George Zipfel, Summit, NJ (US)

(73) Assignee: Hood Technology Corporation, Hood River, OR (US)

( * ) Notice: Subject to any disclaimer, the term of this patent is extended or adjusted under 35 U.S.C. 154(b) by 4 days.

(21) Appl. No.: 09/650,294

(22) Filed: Aug. 29, 2000

Related U.S. Application Data

(60) Provisional application No. 60/151,568, filed on Aug. 31, 1999.

(51) Int. Cl.[7] ............................................. F01D 00/00
(52) U.S. Cl. ........................... 415/1; 415/116; 415/119; 415/208.2; 415/914
(58) Field of Search .............................. 415/42, 14, 17, 415/33, 36, 119, 116, 117, 914, 1, 208.2

(56) References Cited

U.S. PATENT DOCUMENTS

| | | | | |
|---|---|---|---|---|
| 5,141,391 A | * | 8/1992 | Acton et al. | 415/119 |
| 5,553,995 A | * | 9/1996 | Martinez | 415/42 |
| 5,586,857 A | * | 12/1996 | Ishii et al. | 415/17 |
| 5,782,603 A | * | 7/1998 | O'Brien et al. | 415/1 |
| 5,813,828 A | * | 9/1998 | Norris | 415/115 |
| 5,984,625 A | * | 11/1999 | Murray et al. | 415/14 |
| 6,146,088 A | * | 11/2000 | Martinez | 415/1 |
| 6,299,410 B1 | * | 10/2001 | Hilbert et al. | 415/14 |

* cited by examiner

Primary Examiner—F. Daniel Lopez
Assistant Examiner—James M McAleenan
(74) Attorney, Agent, or Firm—Bell, Boyd & Lloyd LLC

(57) ABSTRACT

A method for reducing blade vibration in turbo-machinery is described. The method involves inserting flow obstructions and/or gas injections upstream of vibrating blades in such a manner that power flow into the blades is reduced by means of cancellation within a modal power integral.

13 Claims, 6 Drawing Sheets

Wake Profile with Mid-Bay Actuator

Wake Profile with Actuator Collocated with Stator Vane

BLADE VIBRATION CONTROL IN TURBO-MACHINERY

The present application is directly related to U.S. Provisional Patent Application No. 60/151,568, filed Aug. 31, 1999, the entire contents of which are hereby incorporated by reference and relied upon.

BACKGROUND OF INVENTION

1. Field of the Invention

The present application discloses a method for reducing blade vibration in turbo-machinery. The method involves inserting flow obstructions and/or gas injections upstream of vibrating blades in such a manner that power flow into the blades is reduced by means of cancellation within a modal power integral.

2. Description of the Related Art

Rotor blades in turbo-machinery are excited into resonant vibrations by inhomogeneities in the flow stream. These excitations cause cyclic stress, resulting in high cycle fatigue and premature failure in the blades. The blades are excited to large amplitude when a blade modal frequency corresponds to the shaft rotational frequency multiplied by the harmonic number of the flow inhomogeneity seen by the blade. Typically the number of resonances with amplitude large enough to cause high cycle fatigue is limited. Since the damage rate from fatigue is approximately proportional to the sixth power of the cyclic stress amplitude, a modest reduction in the vibration amplitude often will eliminate high cycle fatigue as the limiting factor for blade life.

One current practice is to avoid operation at the resonant frequency by changing the speed rapidly when a resonance is encountered, thereby minimizing the number of fatigue cycles that a blade accumulates. If the number of vibration cycles is kept small by this strategy, then blade failure will be controlled by other mechanisms. However, this practice places undesirable limits on the operation of turbo-machinery and the aircraft.

Another current approach is to reduce the spatial variations in the flow field by directly injecting air into low-velocity wakes behind obstructions (Rao, N. M., Feng, J., Burdisso, R. A, and Ng, W. F., "Active Flow Control to Reduce Fan Blade Vibration and Noise", $5^{th}$ AIAA/CEAS Aeroacoustic Conference, American Institute of Aeronautics and Astronautics, May 10–12, 1999). This approach requires the use of either air from the compressor or from an additional external air source in relatively large quantities. Use of compressor air has a detrimental impact on performance. The addition of a separate air supply adds weight and requires power. Both methods have detrimental impacts on performance. Also, wake filling does not address modal excitation due to bow waves from down stream flow obstructions.

SUMMARY OF THE PRESENT INVENTION

The current invention is a method of reducing blade excitation. The invention employs a control system and aerodynamic elements that modify the spatial distribution of flow striking the blades. The flow distribution is modified so as to reduce the power flowing into a mode by orthogonalizing the unsteady pressure field on the surface of the blade and the modal velocity distribution on the surface of the blade. One means to this end is to insert simple obstructions into the flow just upstream of the resonating rotor blades. These obstructions need only be deployed when the rotor speed corresponds to resonant excitation. They can be mounted on the case, vanes, or struts. Various control modes are possible. The control system can include: (1) a fixed position, (2) a very simple, open-loop, scheduled deployment, and/or (3) a feedback control system with sensors to measure blade vibration.

More specifically, the present invention is for a system for reducing blade vibration in turbo-machinery. The system comprises placing physical or mechanical obstructions upstream of vibrating blades in turbo-machinery in a manner so that power flow into blade vibration is reduced by means of cancellation within a modal power integral, where the obstructions are selected from the group consisting of flow obstructions, gas injections and combinations of flow obstructions and gas injections.

In preferred embodiments of the system, the obstructions are located on an interior surface of a turbo-machine case to achieve such cancellation; the obstructions are located on or behind vanes of a turbo-machine to achieve such cancellation; or the obstructions are located on or behind struts of a turbo-machine to achieve such cancellation.

In more preferred embodiments of the system, reconfiguration of the flow obstructions is scheduled on the basis of rpm of the blades; reconfiguration of the flow obstructions is adjusted using blade vibration sensors; and/or the obstructions are in a fixed position.

DETAILED DESCRIPTION OF THE INVENTION

Figure 1:
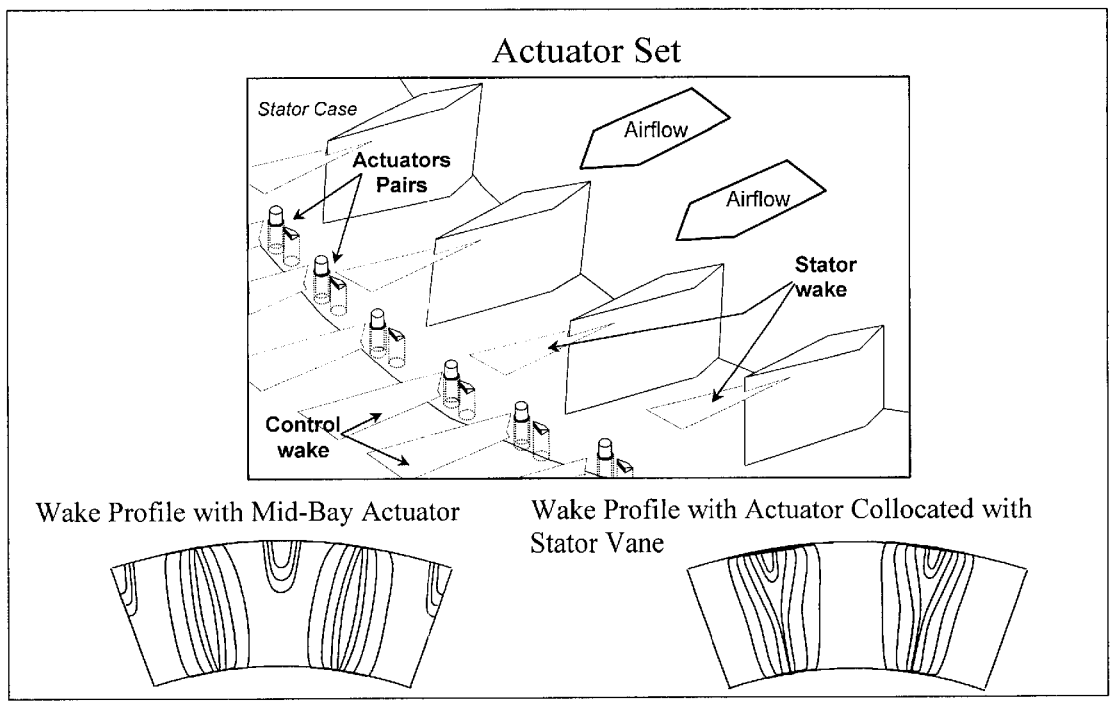
FIG. 1: Overview of turbo-machinery stator stage showing flow modifiers for reducing modal vibrations induced by spatial variation in the flow field.

The approach taken here modifies the flow pattern of the air coming into the blades so as to reduce the degree of coupling between the blade mode and the flow field with minimal change in the net flow as shown in FIG. 1.

In contrast to wake filling, the spatial variations in the flow field may be increased but in such a way as to reduce modal vibration. This occurs because the power flowing into a blade modal vibration is the product of the pressure at the surface of the blade times the velocity of the blade perpendicular to the blade surface, expressed as:

$$\text{Power} = \int_{blade\ surface} \text{Pressure}(F, f_0) \text{Velocity}(F) d\text{Area}$$

where Pressure($F, f_0$) and Velocity($F$) are the dynamic pressure and surface-normal blade velocity on the blade surface at the mode resonance frequency $f_0$ and coordinates specifying position on the blade surface F.

This invention takes advantage of the integrand being both positive and negative. The flow is modified in such a way that the positive and negative contributions in the integrand cancel. Surface-normal Velocity(F) in most cases has different signs in different places on the blade surface, an exception being a pure cantilever first-bending mode. Crossing a nodal line causes the polarity or sign of Velocity(F) to change. Unsteady Pressure($F,f_0$) varies in magnitude and phase both along the cord and the radius. The result of these variations is a residual net value of the integral after much cancellation.

The control strategy is to increase cancellation under the integral: unsteady pressures should cancel one another. There are several strategies to reduce the modal excitation; however, the ultimate result is the same, a decrease in modal excitation caused by increased equality between the negative and positive contributions to the power integral. This increased cancellation results in lower power flow into the vibration and reduced levels of resonant response.

An overall reduction in the magnitude of Pressure($F,f_0$) as a way of reducing Power looks superficially similar to the invention but is not, because its goal is not increased cancellation. Rather, the invention reduces the requirements on the degree of flow actuation by improving the cancellation between dominant and non-dominant regions, rather than by suppressing flow inhomogeneity.

Flow field modification is achieved by introducing flow modifiers, typically wake generators, upstream from a set of rotor blades. The modifiers can be placed in the turbo-machine in many ways. Selection of placement and configuration is determined by the pattern of air flow, by the vibration pattern of the rotor blades, and by practical considerations, such as fitting into the machinery design. Flow modifiers can be placed on the case, on the stator vanes, and on radial struts, as shown in FIGS. 2–6. Deployment strategies include permanent flow modification, continuously variable flow modification and on-off flow modification. Because the inflow field is modified in a quasi-static manner, the bandwidth requirements on the actuator are very modest, typically on the order of 1 Hz. In most cases open loop scheduling of the flow modifiers will be practical; reducing the vibration to a level that will result in an effectively unlimited blade life and simultaneously having minimal impact upon thermodynamic performance of the machine. For those cases where the excitation is very strong, a full control system, which utilizes sensors to monitor blade vibration, will result in a more accurate cancellation force, producing the larger reductions in the modal vibration.

One advantage from using flow modifiers is that the flow modifier does not directly supply the cancellation forces that reduce blade vibration. Rather, the redistribution of air inflow is used to generate the forces needed to reduce blade vibration. The flow modifier redirects the flow acting much like a valve. The flow modifier is designed to minimize aerodynamic forces transferred to the actuator, reducing the actuation requirements. The actuator has only to overcome the residual effects of friction and inertia in the flow modifier mechanism.

For wake generators located on the turbo-machine case, positions along the circumference and the size of the modifiers determine effects on the modal excitation. The circumferential location of the wake generators determines the phase of the cancellation force on blade vibration.

Spatial variations in the pressure on the blades is due to either wakes from upstream vanes and struts or bow wakes from downstream vanes and struts. The locations of the wake generators along the circumference are determined by the phase of the blade response to the flow field causing the vibration. If the phase of the forcing is not known or if several resonances are to be canceled, then multiple wake generators are needed for each spatial period of the forced vibration. In the most general case, only three wake generators per bay are needed, but a sparse distribution, of fewer per bay and/or by omitting generators from some bays, can be used as long as the excitation of additional undesirable modes does not occur.

EXAMPLES

The following examples are included to demonstrate preferred embodiments of the invention. It should be appreciated by those skilled in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the concept, spirit and scope of the invention. More specifically, it will be apparent that certain elements which are both structurally and mechanically related may be substituted for the elements described herein while the same or similar results would be achieved. All such similar substitutes and modifications apparent to those skilled in the art are deemed to be within the spirit, scope and concept of the invention as defined by the appended claims.

Example 1

Figure 2:
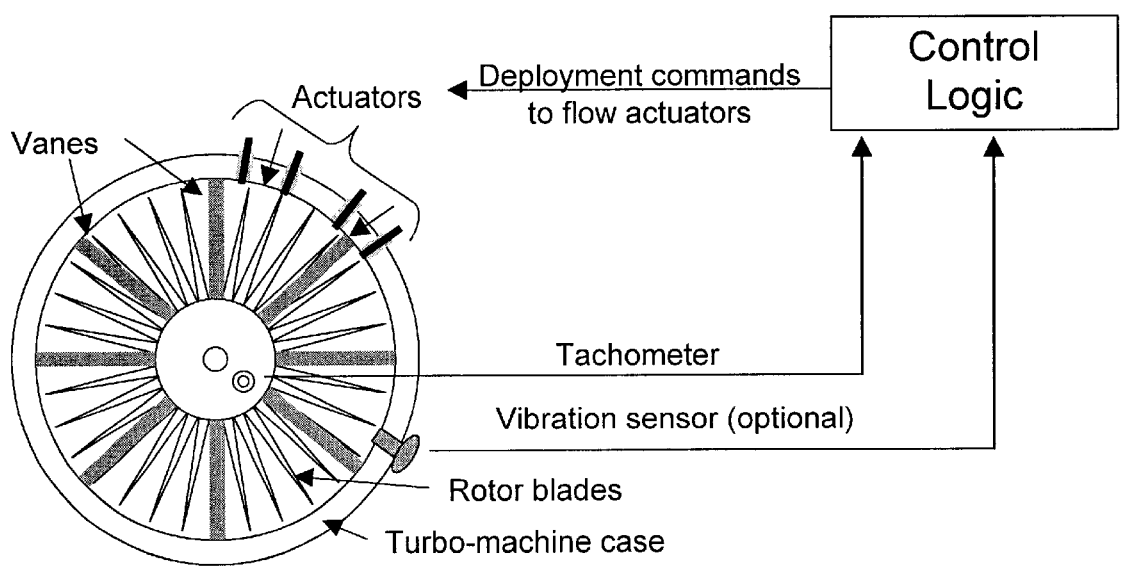
FIG. 2: Control system lay-out. In this example, actuators deployed from the turbo-machine case are controlled according to rotor rpm and vibration measurements.

FIG. 2 shows the control system lay-out. In this example, actuators deployed from the turbo-machine case are controlled according to rotor rpm and vibration measurements. In many cases, it will be possible to achieve good vibration reduction without the use of vibration measurements. In such cases, deployment would depend upon rpm only.

Example 2

Figure 3:
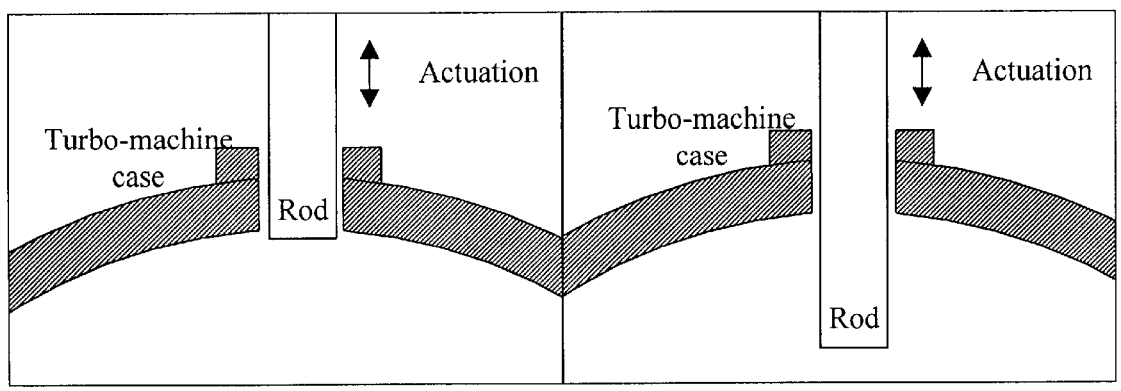
FIG. 3: Cylindrical flow modifier deployed from turbo-machine case (linear actuation). Circumferential position of the flow modifier and degree of deployment are used to adjust the effect so as to reduce vibration.

FIG. 3 shows a cylindrical flow modifier deployed from a turbo-machine case (linear actuation). Circumferential position of the flow modifier and degree of deployment are used to adjust the effect so as to reduce vibration.

Example 3

Figure 4:
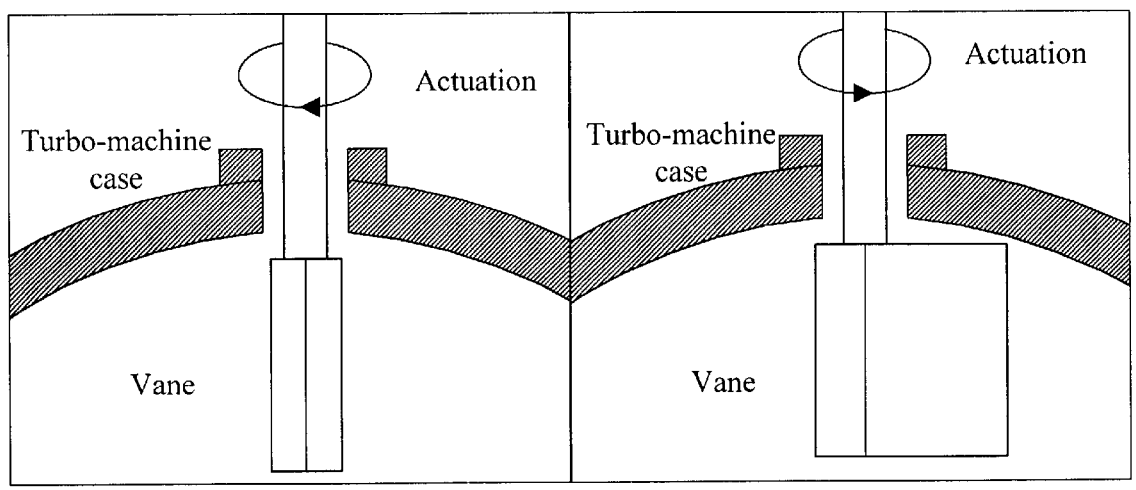
FIG. 4: Vane flow modifier deployed from the turbo-machine case (rotational actuation). Span-wise position of the flow modifier and degree of deployment are used to adjust the effect so as to reduce vibration.

FIG. 4 shows a vane flow modifier deployed from the turbo-machine case (rotational actuation). Span-wise position of the flow modifier and degree of deployment are used to adjust the effect so as to reduce vibration.

Example 4

Figure 5:
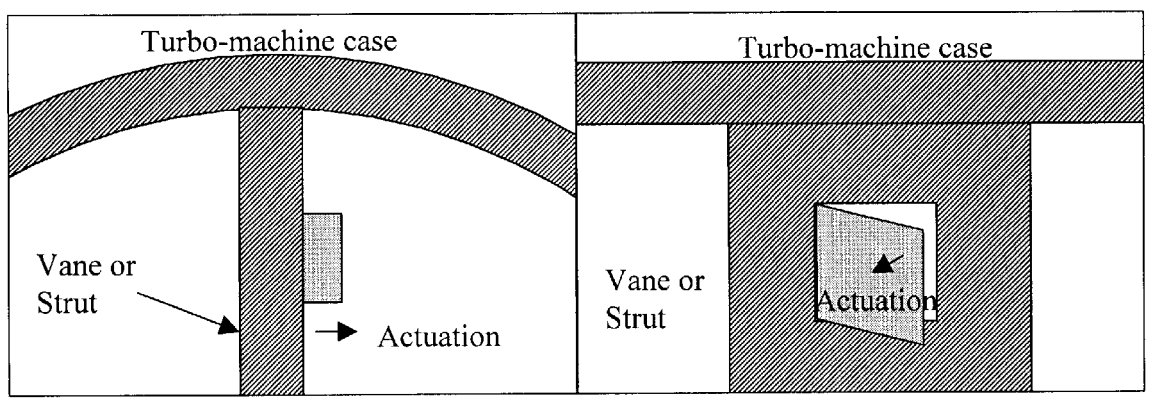
FIG. 5: Pop up spoiler on vane or radial strut. Span-wise position of the flow modifier and degree of deployment are used to adjust the effect so as to reduce vibration.

FIG. 5 shows a pop up spoiler on a vane or radial strut. Span-wise position of the flow modifier and degree of deployment are used to adjust the effect so as to reduce vibration.

Example 5

Figure 6:
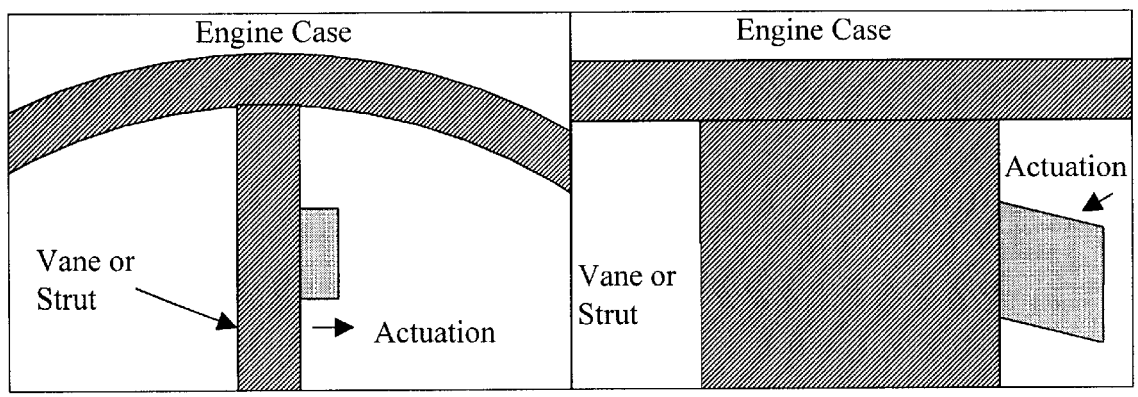
FIG. 6: Pop up spoiler or rotating vane behind vane or radial strut. Span-wise position of the flow modifier and degree of deployment are used to adjust the effect so as to reduce vibration.

FIG. 6 shows a pop up spoiler or rotating vane behind a vane or radial strut. Span-wise position of the flow modifier and degree of deployment are used to adjust the effect so as to reduce vibration.

While the invention has been described in connection with what is presently considered to be the most practical and preferred embodiments, it is to be understood that the invention is not limited to the disclosed embodiments, but on the contrary, is intended to cover various modifications and equivalent arrangements included within the spirit and scope of the appended claims.

Thus, it is to be understood that variations in the present invention can be made without departing from the novel aspects of this invention as defined in the claims. All patents and articles cited herein are hereby incorporated by reference in their entirety and relied upon.

What is claimed is:

1. A method for reducing blade vibration in turbo-machinery comprising the step of:

placing physical or mechanical obstructions upstream of vibrating blades in turbo-machinery in a manner so that power flow into said vibrating blades reduces blade vibrations by means of cancellation within a modal power integrally, wherein said modal power integral is the product of pressure at a blade surface times velocity of said blade perpendicular to said blade surface, and wherein said obstructions are selected from the group consisting of flow obstructions, gas injections and combinations of flow obstructions and gas injections.

2. The method of claim 1, wherein the obstructions are located on an interior surface of a turbo-machine case to achieve such cancellation.

3. The method of claim 2, wherein reconfiguration of the obstructions is scheduled on the basis of rpm of the blades.

4. The method of claim 2, wherein reconfiguration of the obstructions is adjusted using blade vibration sensors.

5. The method of claim 2, wherein the obstructions are in a fixed position.

6. The method of claim 1, wherein the obstructions are located on vanes of a turbo-machine to achieve such cancellation.

7. The method of claim 6, wherein reconfiguration of the obstructions is scheduled on the basis of rpm of the blades.

8. The method of claim 6, wherein reconfiguration of the obstructions is adjusted using blade vibration sensors.

9. The method of claim 6, wherein the obstructions are in a fixed position.

10. The method of claim 1, wherein the obstructions are located on struts of a turbo-machine to achieve such cancellation.

11. The method of claim 4, wherein reconfiguration of the obstructions is scheduled on the basis of rpm of the blades.

12. The method of claim 4, wherein reconfiguration of the obstructions is adjusted using blade vibration sensors.

13. The method of claim 4, wherein the obstructions are in a fixed position.

* * * * *